United States Patent
Johnson

(10) Patent No.: US 10,125,593 B2
(45) Date of Patent: Nov. 13, 2018

(54) USE OF SEAWATER CONDITIONING BYPRODUCTS FOR ENERGY INDUSTRY OPERATIONS

(71) Applicant: Michael Johnson, Katy, TX (US)

(72) Inventor: Michael Johnson, Katy, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/241,636

(22) Filed: Aug. 19, 2016

(65) Prior Publication Data
US 2018/0051545 A1    Feb. 22, 2018

(51) Int. Cl.

| | |
|---|---|
| *E21B 43/40* | (2006.01) |
| *E21B 43/22* | (2006.01) |
| *E21B 43/26* | (2006.01) |
| *B01D 61/02* | (2006.01) |
| *C02F 1/44* | (2006.01) |
| *E21B 21/00* | (2006.01) |
| *E21B 47/06* | (2012.01) |
| *E21B 43/25* | (2006.01) |
| *C02F 101/10* | (2006.01) |

(Continued)

(52) U.S. Cl.
CPC ............ *E21B 43/26* (2013.01); *B01D 61/025* (2013.01); *C02F 1/441* (2013.01); *E21B 21/00* (2013.01); *E21B 43/25* (2013.01); *E21B 47/06* (2013.01); *C02F 2101/101* (2013.01); *C02F 2103/08* (2013.01); *C02F 2103/10* (2013.01); *E21B 33/12* (2013.01); *E21B 2034/007* (2013.01)

(58) Field of Classification Search
CPC ........ E21B 43/28; E21B 43/29; E21B 43/121; E21B 43/20; E21B 43/36; E21B 43/385; E21B 43/40; E21B 41/04

USPC .......................................................... 166/304
See application file for complete search history.

(56) References Cited

U.S. PATENT DOCUMENTS

| 6,190,556 B1 | 2/2001 | Uhlinger |
| 7,789,159 B1 * | 9/2010 | Bader .................... B01D 61/04 166/279 |

(Continued)

FOREIGN PATENT DOCUMENTS

WO    2016003928 A1    1/2016

OTHER PUBLICATIONS

Robinson, David; "Oil and Gas: Water Treatment in Oil and Gas Production does it matter?"; Filteration+Seperation; Feb. 24, 2010; Retrieved from the internet:, http://www.filtsep.com/water-and-wastewater/features/oil-and-gas-water-treatment-in-oil-and-gas/; 5 pages.

(Continued)

*Primary Examiner* — Zakiya W Bates
(74) *Attorney, Agent, or Firm* — Cantor Colburn LLP

(57) ABSTRACT

An embodiment of a method of performing an energy industry operation includes receiving a byproduct fluid from a fluid conditioning system, the fluid conditioning system configured to at least partially desalinate seawater and produce desalinated seawater and the byproduct fluid, the byproduct fluid having a higher salt concentration than the received seawater. The method also includes performing an energy industry operation that includes injecting an injection fluid including the byproduct fluid by a pumping device through a carrier disposed in a borehole in an earth formation and into at least one of the borehole and the earth formation.

17 Claims, 3 Drawing Sheets

(51) Int. Cl.
  *C02F 103/08* (2006.01)
  *E21B 33/12* (2006.01)
  *E21B 34/00* (2006.01)
  *C02F 103/10* (2006.01)

(56) References Cited

U.S. PATENT DOCUMENTS

| | | |
|---|---|---|
| 2012/0067820 A1 | 3/2012 | Henthorne et al. |
| 2012/0125611 A1 | 5/2012 | Ayirala et al. |
| 2012/0292012 A1 | 11/2012 | Williams |
| 2014/0354032 A1* | 12/2014 | Haugen .................. E21B 43/28 299/4 |

OTHER PUBLICATIONS

International Search Report, International Application No. PCT/US2017/041826, dated Oct. 20, 2017, Korean Intellectual Property Office; International Search Report 3 pages.

International Written Opinion, International Application No. PCT/US2017/041826, dated Oct. 20, 2017, Korean Intellectual Property Office; International Written Opinion 12 pages.

* cited by examiner

USE OF SEAWATER CONDITIONING BYPRODUCTS FOR ENERGY INDUSTRY OPERATIONS

BACKGROUND

In hydrocarbon exploration operations, subsea and land-based systems are used to explore formations, drill boreholes, perform formation measurements and perform various other operations. A variety of tools or devices, such as sensors, fluid flow control devices and electronic units are typically deployed at surface and/or borehole locations to facilitate such operations.

Many energy industry or downhole operations involve injecting or pumping fluids into a borehole and/or earth formation. Examples of such operations include drilling, stimulation and hydrocarbon production operations. Such fluids are typically engineered to have specific properties, such as fluid density and acidity levels, that are selected to facilitate operations.

SUMMARY

An embodiment of a method of performing an energy industry operation includes receiving a byproduct fluid from a fluid conditioning system, the fluid conditioning system configured to at least partially desalinate seawater and produce desalinated seawater and the byproduct fluid, the byproduct fluid having a higher salt concentration than the received seawater. The method also includes performing an energy industry operation that includes injecting an injection fluid including the byproduct fluid by a pumping device through a carrier disposed in a borehole in an earth formation and into at least one of the borehole and the earth formation.

An embodiment of a system for performing an energy industry operation includes a fluid conditioning system configured to receive seawater, at least partially desalinate the seawater and produce desalinated seawater and a byproduct fluid, the byproduct fluid having a higher salt concentration than the received seawater. The system also includes an injection system configured to receive the byproduct fluid, the injection system including a pumping device configured to inject an injection fluid including the byproduct fluid through a carrier disposed in a borehole in an earth formation and into at least one of the borehole and the earth formation as part of an energy industry operation.

BRIEF DESCRIPTION OF THE DRAWINGS

The following descriptions should not be considered limiting in any way. With reference to the accompanying drawings, like elements are numbered alike.

DETAILED DESCRIPTION

Systems and methods are described herein for performing aspects of energy industry operations, such as drilling, stimulation and pressure pumping operations, which include downhole injection of fluids. An embodiment of a method includes pumping or otherwise advancing seawater through a desalination or other seawater conditioning device or system. Byproducts from the conditioning, such as concentrate or seawater brine, instead of being discarded, are pumped or otherwise advanced to pumps or other fluid injection devices and injected downhole as part of an energy industry operation. The byproduct fluid may be pumped directly from the conditioning device or system to injection pumps, further processed to adjust properties of the byproduct (e.g., salt content and fluid density) prior to advancing the byproduct to the pumps, or stored for later downhole use. Embodiments described herein provide a source of injection fluid without requiring substantial additional equipment, and save time and cost by, e.g., removing the need to transport injection fluid and using existing systems to efficiently produce pumping fluid.

Figure 1:
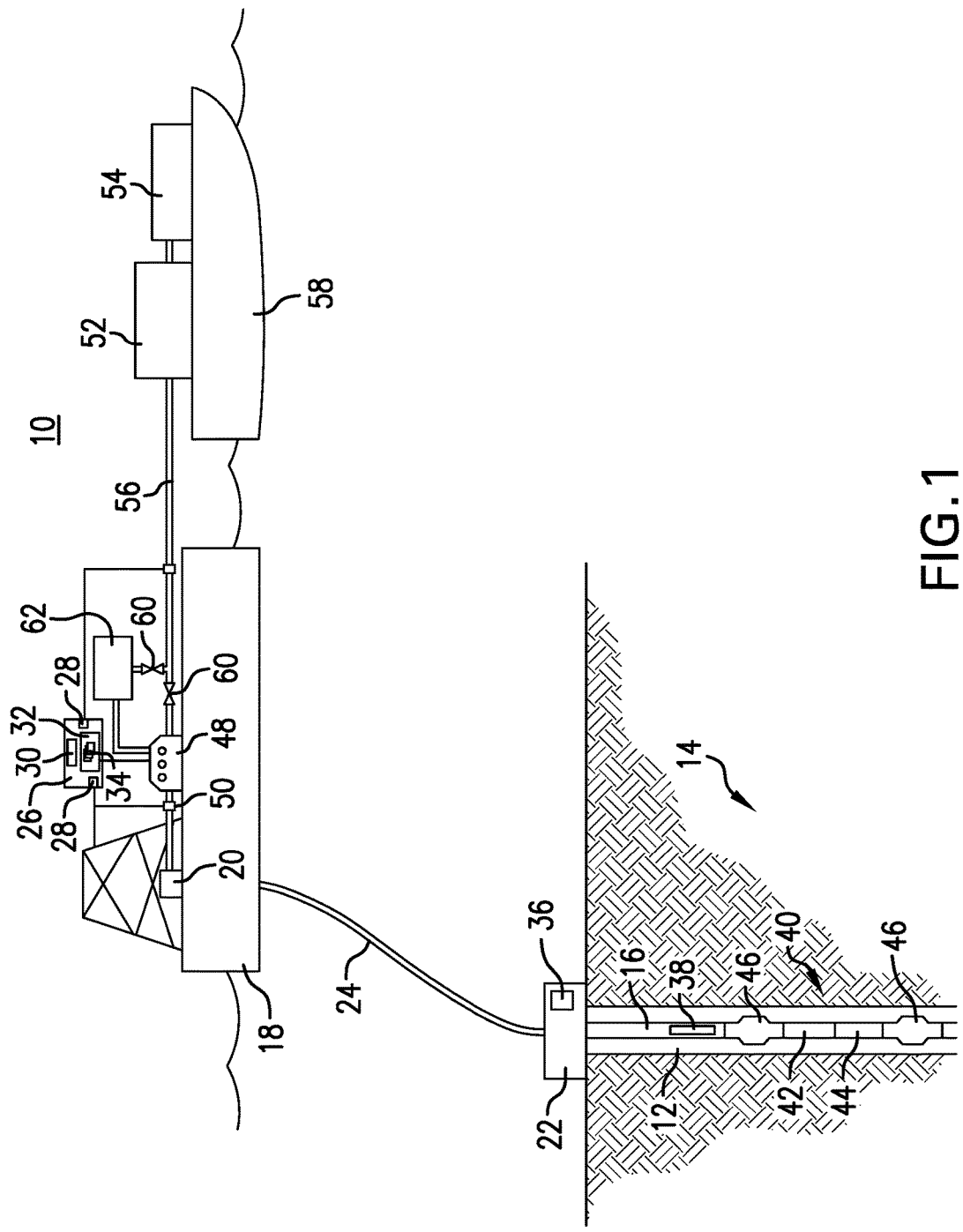
FIG. 1 depicts an embodiment of a system for performing energy industry operations.

FIG. 1 illustrates an embodiment of a system 10 for performing energy industry operations such as drilling a borehole 12 in an earth formation 14, formation measurement and/or evaluation, hydrocarbon production, completion and/or stimulation. The borehole 12 may be an open borehole, a cased borehole, or have both cased and open sections. The system 10 includes a borehole string or tool string 16 configured to deploy an assembly of downhole components in the borehole 12. In one embodiment, the borehole string includes a workstring, tubular, tubing, casing or other component or combination of components configured to convey fluid into a borehole and/or formation. The downhole components may be deployed using any suitable carrier, such as the borehole string 16, a drill string, coiled tubing, a wireline, wired pipe, and/or a completion and production string. The wireline may include one or multiple conductors for providing signal communications and electrical power to the assembly. A "carrier" as described herein means any device, device component, combination of devices, media and/or member that may be used to convey, house, support or otherwise facilitate the use of another device, device component, combination of devices, media and/or member. Exemplary non-limiting carriers include coiled tubing, drill strings of the coiled tube type, of the jointed pipe type and any combination or portion thereof. Other carrier examples include wirelines, wireline sondes, slickline sondes, drop shots, downhole subs, bottom-hole assemblies, and drill strings.

In one embodiment, the system 10 is configured to perform energy industry operations in a subsea environment, i.e., an environment where an earth formation is located under a body of water. For example, the system 10 includes a surface facility 18 such as one or more platforms and/or marine vessels. The surface facility 18 includes a surface wellhead 20 connected to the borehole 12 via, e.g., a subsea wellhead 22.

The subsea wellhead 22, downhole components and/or subsea components are connected to the surface facility 18 via one or more risers 24. A riser 24 may include a tubular for flowing fluids between the borehole 12 and the surface facility, such as production fluids (e.g., oil, gas, water etc.) and injection fluids (e.g., fracturing fluid, drilling fluid, etc.). The riser may include a communication link such as a communication cable for transmitting power and/or communications.

Any number of downhole and/or subsea tools or components may be deployed in the borehole, including, for example a number of sensors, control devices, electronic devices, drilling assemblies, stimulation assemblies, pumps, etc. The tools or components may include various sensing or measurement devices in downhole and/or surface locations.

For example, one or more parameter sensors (such as gauges, permanently installed gauges and/or sensor assemblies such as LWD subs) are configured for formation evaluation measurements relating to the formation, borehole, geophysical characteristics and/or borehole fluids. These sensors may include formation evaluation sensors (e.g., resistivity, dielectric constant, water saturation, porosity, density and permeability), sensors for measuring geophysical parameters (e.g., acoustic velocity and acoustic travel time), and sensors for measuring borehole fluid parameters (e.g., viscosity, density, clarity, rheology, pH level, and gas, oil and water contents). It is noted that the use of the term "tool" is intended to encompass any device or component that can be deployed downhole, on the surface or subsea and communicate with a processor located at the surface and/or a wellhead component.

The surface wellhead 20, subsea wellhead 22, surface equipment and/or downhole tools or components are connected to means for communicating with one or more processing devices located at a surface location and/or disposed downhole. For example, downhole components and/or surface equipment are connected in communication with a surface processing unit 26 or other processor, such as a surface control unit or a remote unit such as a data center. The surface processing unit 26 is configured to receive, store and/or transmit data and signals, and includes processing components configured to analyze data and/or control operational parameters. In one embodiment, the surface processing unit 26 is configured to control energy industry operations performed using the system 10. Operational parameters may be controlled or adjusted automatically by the surface processing unit 26 in response to sensor data, or controlled by a human operator or remote processing device. The surface processing unit 26 includes any number of suitable components, such as processors, memory, communication devices and power sources. For example, the surface processing unit 26 includes input/output components 28, a processor 30 (e.g., a microprocessor), and a memory 32 storing software and/or processing modules 34. The software and/or processing modules 34 may be configured to perform all or part of the methods described herein. In addition or as an alternative to surface processors, processing capability may be located subsea and/or downhole, for example, as subsea wellhead electronics 36 and/or downhole electronics 38, which may perform all or some of the functions described in conjunction with the surface processing unit 26.

Signals and data may be transmitted via any suitable transmission device or system, such as various wireless configurations as described further below and wired communications. Techniques used to transmit signals and data include wired pipe, electric and/or fiber optic connections, mud pulse, electromagnetic and acoustic telemetry.

In one embodiment, the system 10 is configured as a fluid injection or pressure pumping system. The fluid injection system may be used for a number of purposes, such as stimulation (e.g., hydraulic fracturing), drilling and production. A fluid may be any flowable substance such as a liquid or a gas, and/or a flowable solid such as sand. In this embodiment, the string 16 includes an injection assembly 40 that includes one or more tools or components to inject fluid into the formation 14. For example, the string 16 includes an injection device 42 such as a fracture or "frac" sleeve. Additional components may be included such as a perforation assembly 44 and one or more isolation or packer subs 46.

In one embodiment, the injection assembly 40 is connected to subsea and/or surface equipment for injection of fluids into the borehole 12 and/or the formation 14. The surface equipment, in one embodiment, includes an injection device such as a high pressure pump 42 in fluid communication with a fluid source or combination of fluid sources. The pump 48 injects fluid into the string 16 or the borehole 12 to introduce fluid into the formation 14, for example, to stimulate and/or fracture the formation 14. The pump 48 may be located downhole, subsea (e.g., on the ocean floor) or at a surface location as shown in FIG. 1.

One or more flow rate and/or pressure sensors 50 are disposed in fluid communication with the pump 48 and the string 16 for measurement of fluid characteristics. The sensors 50 may be positioned at any suitable location, such as proximate to (e.g., at the discharge output) or within the pump 48, at or near the surface and/or subsea wellhead, or at any other location along the string 16 or the borehole 12. The sensors described herein are exemplary, as various types of sensors may be used to measure various parameters. The surface processing unit 26 (or other suitable processing device) may be configured to receive, store and/or transmit data generated from the sensors 50 and/or the pump 48, and may be configured to monitor and/or control fluid injection and any other suitable operational parameters.

In one embodiment, the surface facility 18 includes or is connected to a fluid conditioning system 52. The fluid conditioning system includes various devices and systems for filtering or conditioning seawater (defined as water taken from any salt water body, such as a saltwater lake, sea or ocean). For example, the fluid conditioning system 52 includes at least one or more de-sulfonating units and one or more desalination units. Conditioned seawater (e.g., de-sulfonated and desalinated water) may be pumped or advanced to a storage device such as a fluid tank 54.

The fluid conditioning system 52 is configured to provide a source of injection fluid to the surface facility 18 to be used in downhole or energy industry operations that involve injection or circulation of fluids downhole. For example, byproduct fluid from the fluid conditioning system is directed to the pump 48 via a fluid line 56 for injection. The byproduct fluid in this example is a brine solution that results from desalination. The brine solution has a higher proportion of salt and a higher fluid density than the originally collected seawater as a result of the desalination process, and may have a density that is sufficiently high for use as an injection fluid. For example, untreated seawater has a salt solution of about 3% and has a density that may be too low for fracturing and other operations. In contrast, the byproduct fluid is a more concentrated solution of, e.g., about 6.5%, which provides a sufficient density or fluid weight for a number of operations. The fluid conditioning process may be adjusted as desired to produce a byproduct fluid having various salt concentrations.

As described herein "desalinated seawater" or "conditioned seawater" refers to salt water, taken from a marine environment, having an amount of salt removed therefrom or having a salt concentration reduced. The amount of salt removed or concentration reduced may be controlled by appropriately configuring the desalination units, thereby controlling the amount or concentration of salt in the byproduct fluid.

In the embodiment of FIG. 1, the fluid conditioning system 52 is disposed on a separate vessel 58, but is not so limited. For example, the fluid conditioning system may be disposed at the surface facility 18, another platform or on shore. In addition, the system 10 is not limited to purely offshore use. For example, the surface facility 18 may be disposed on land and connected to a fluid conditioning system located offshore or on land. In another example, the surface facility 18 is a terrestrial facility connected to an onshore desalination plant (e.g., for drinking water).

In use, seawater is pumped to the fluid conditioning system 52, which conditions the seawater, e.g., by de-sulfonating and desalinating the seawater. The conditioned seawater is advanced to the storage 54, and the byproduct fluid (e.g., de-sulfonated and concentrated seawater) is pumped to the surface facility 18 and downhole via the pump 48. The byproduct fluid may be pumped directly downhole as needed, diverted to another storage location, and/or treated prior to injection. For example, valves 60 may be operated by the surface processing unit 26 to direct the byproduct fluid to a fluid treatment device or system 62 that treats the byproduct fluid, e.g., to further filter the fluid or add additional fluid components (e.g., proppants, friction reducers, etc.).

Figure 2:
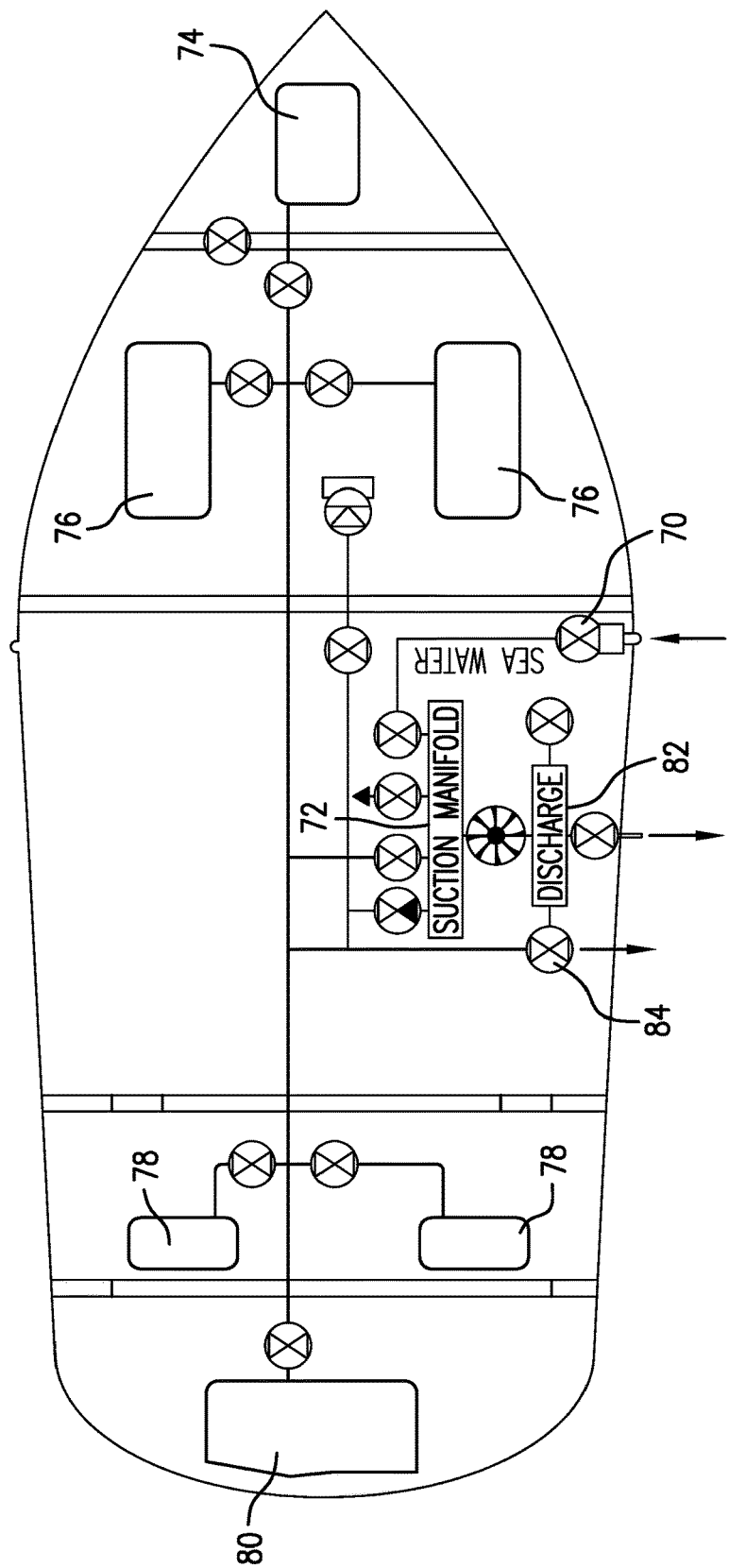
FIG. 2 depicts an example of an offshore vessel for performing aspects of energy industry operations.

FIG. 2 illustrates an example of a fluid conditioning system that may be disposed on the vessel 58 or any other onshore or offshore location. For example, the fluid conditioning system may be part of a treatment and/or production vessel that is used in conjunction with hydraulic fracturing, drilling and/or hydrocarbon production platforms or vessels.

The fluid conditioning system in this example includes a seawater intake system 70 including, e.g., pumps, valves and screens. The intake system 70 directs seawater to a suction manifold 72, which in turn directs the seawater to holding tanks 74. The seawater is then circulated through one or more desalination units 76, such as reverse osmosis membrane desalination units. In one embodiment, the seawater is directed to holding tanks 78 and to one or more de-sulfonating units 80 prior to desalination. The treated water is then output to a suitable storage location via discharge 82.

The byproduct of the desalination and/or de-sulfonating is concentrated seawater having a high concentration of salt. The concentrated seawater is directed via an output valve 84 to the surface facility 18.

In addition to the desalination units, the fluid conditioning system any include various other components or systems, such as antimicrobial and antibacterial treatment units, filtration systems and post-treatment systems (e.g., for chlorination).

Figure 3:
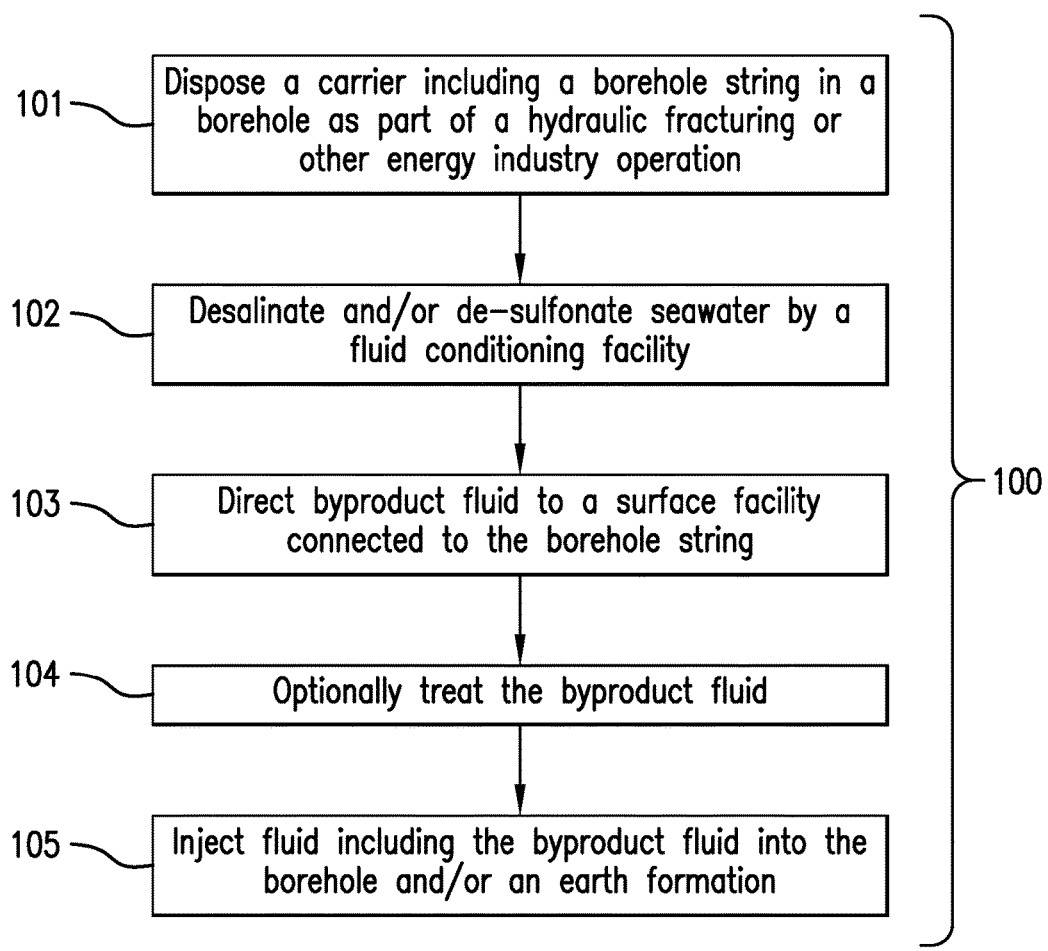
FIG. 3 is a flow chart depicting an embodiment of a method of performing aspects of an operation that includes injection of fluids into a borehole and/or earth formation.

FIG. 3 illustrates a method 100 of performing aspects of an energy industry operation. In one embodiment, the method 100 is performed using the system 10. However, the method 100 is not so limited and may be performed in conjunction with any device, group of devices or system that includes capability to receive desalinated seawater and inject the seawater and/or fluids including the desalinated seawater. One or more of stages 101-105 discussed below may be performed by a processing device such as the surface processing unit 26.

The method 100 includes one or more of the stages 101-105 described herein. In one embodiment, the method includes the execution of all of stages 101-105 in the order described. However, certain stages may be omitted, stages may be added, or the order of the stages changed.

In the first stage 101, a carrier such as the borehole string 16 including one or more tools is disposed in a borehole as part of an energy industry operation. In one embodiment, the borehole string 16 is disposed in the borehole via an offshore structure such as the surface facility 18.

An example of an energy industry operation is a stimulation operation such as a hydraulic fracturing operation. In this example, hydraulic fracturing tools such as the injection assembly 40 are disposed in a borehole and connected to surface equipment such as the pump 48.

In the second stage 102, seawater is collected from a body of water (e.g., a sea or ocean) by a fluid conditioning facility or system, such as a desalination plant or an offshore facility, e.g., the vessel 58. Collected seawater is directed through various conditioning units to desalinate (i.e., remove some amount of salt) the seawater and optionally to further treat or condition the seawater.

In one embodiment, the fluid conditioning facility includes a de-sulfonating unit and may also include other equipment such as filtration equipment. The seawater is directed through both the de-sulfonating unit and the desalination unit.

As a result of the desalination, a byproduct fluid is produced. The byproduct fluid includes concentrated seawater having a higher concentration of salt that the original collected seawater, due to removal of salt from the treated seawater. For example, the byproduct fluid is concentrated seawater having a salt concentration of about 6%, as compared to the original collected seawater salt concentration of about 3%.

In one embodiment, desalination is controlled to produce a byproduct fluid having a selected concentration or concentration range. The amount of salt in the seawater affects the fluid density, and the desalination may be controlled (e.g., by controlling the number of membranes of units through which the seawater is circulated) to produce byproduct fluid having a selected concentration and corresponding fluid density.

In the third stage 103, the byproduct fluid is directed to the surface facility 18 or other surface equipment (e.g., a drilling rig or production platform) for use as an injection fluid. For example, byproduct fluid in the form of concentrated (and optionally de-sulfonated) is directed via the fluid line 56 to the surface facility 18.

In the fourth stage 104, in one embodiment, the byproduct fluid is treated to produce an injection fluid suitable for the energy industry operation. The byproduct fluid may be treated in any suitable manner to remove unwanted substances, add additional ingredients or otherwise make the byproduct fluid suitable for downhole use. Examples of treatments include adding ingredients such as sand or other proppants and/or filtering the concentrated seawater. In another example, the byproduct fluid is combined with other types of fluids, such as pre-existing drilling fluid or fracturing fluid.

In the fifth stage 105, the injection fluid, which is or includes the byproduct fluid, is injected into a borehole. For example, the injection fluid is used as a fracturing fluid, and is injected into a formation to fracture the formation and stimulate hydrocarbon production. The injection fluid may be used for other purposes, for example, as drilling fluid and/or production fluid. Operational parameters such as flow rate and pressure may be controlled by the processing device.

The systems and methods described herein provide various advantages over prior art techniques. The systems and methods described herein allow for direct use of surrounding seawater using existing conditioning systems, which provides injection fluids or injection fluid bases without having to transport water from remote locations. In addition, the systems and methods can employ byproducts that are generally discarded, which minimizes or reduces the energy required to produce injection fluids having sufficient density for hydraulic fracturing and other downhole uses.

Embodiment 1. A method of performing an energy industry operation, comprising: receiving a byproduct fluid from a fluid conditioning system, the fluid conditioning system configured to at least partially desalinate seawater and produce desalinated seawater and the byproduct fluid, the byproduct fluid having a higher salt concentration than the received seawater; and performing an energy industry operation that includes injecting an injection fluid including the byproduct fluid by a pumping device through a carrier disposed in a borehole in an earth formation and into at least one of the borehole and the earth formation.

Embodiment 2. The method of any prior embodiment, wherein the fluid conditioning system includes a de-sulfonating unit configured to remove sulfonates from the seawater and the byproduct fluid.

Embodiment 3. The method of any prior embodiment, wherein the energy industry operation is a stimulation operation.

Embodiment 4. The method of any prior embodiment, wherein the fluid conditioning system is configured to desalinate the seawater to produce the byproduct fluid having a salt concentration that results in a fluid density sufficient for the energy industry operation.

Embodiment 5. The method of any prior embodiment, wherein the stimulation operation is a hydraulic fracturing operation, and the injection fluid is injected as a fracturing fluid.

Embodiment 6. The method of any prior embodiment, wherein injecting the injection fluid includes injecting the byproduct fluid without adding any additional ingredients.

Embodiment 7. The method of any prior embodiment, further comprising combining the byproduct fluid with one or more additional ingredients configured to facilitate the energy industry operation.

Embodiment 8. The method of any prior embodiment, wherein the fluid is injected from an offshore platform or vessel.

Embodiment 9. The method of any prior embodiment, wherein the fluid conditioning system is a reverse osmosis membrane system, the membrane system configured to remove an amount of salt from the seawater and produce the byproduct fluid having a salt concentration that is selected for the energy industry operation.

Embodiment 10. The method of any prior embodiment, further comprising at least partially desalinating the seawater by the fluid conditioning system, and directing the byproduct fluid via a fluid line to the pumping device.

Embodiment 11. A system for performing an energy industry operation, comprising: a fluid conditioning system configured to receive seawater, at least partially desalinate the seawater and produce desalinated seawater and a byproduct fluid, the byproduct fluid having a higher salt concentration than the received seawater; and an injection system configured to receive the byproduct fluid, the injection system including a pumping device configured to inject an injection fluid including the byproduct fluid through a carrier disposed in a borehole in an earth formation and into at least one of the borehole and the earth formation as part of an energy industry operation.

Embodiment 12. The system of any prior embodiment, wherein the fluid conditioning system includes a de-sulfonating unit configured to remove sulfonates from the seawater and the byproduct fluid.

Embodiment 13. The system of any prior embodiment, wherein the energy industry operation is a stimulation operation.

Embodiment 14. The system of any prior embodiment, wherein the fluid conditioning system is configured to desalinate the seawater to produce the byproduct fluid having a salt concentration that results in a fluid density sufficient for the stimulation operation.

Embodiment 15. The system of any prior embodiment, wherein the stimulation operation is a hydraulic fracturing operation, and the injection fluid is injected as a fracturing fluid.

Embodiment 16. The system of any prior embodiment, wherein injecting the injection fluid includes injecting the byproduct fluid without adding any additional ingredients.

Embodiment 17. The system of any prior embodiment, further comprising a fluid treatment device configured to combine the byproduct fluid with one or more additional ingredients configured to facilitate the stimulation operation.

Embodiment 18. The system of any prior embodiment, wherein the injection fluid is injected from an offshore platform or vessel.

Embodiment 19. The system of any prior embodiment, wherein the fluid conditioning system is a reverse osmosis membrane system, the membrane system configured to remove an amount of salt from the seawater and produce the byproduct fluid having a salt concentration that is selected for the energy industry operation.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of performing an energy industry operation, comprising:
    receiving a byproduct fluid from a fluid conditioning system, the fluid conditioning system configured to at least partially desalinate seawater and produce desalinated seawater and the byproduct fluid, the byproduct fluid having a higher salt concentration and a higher fluid density than the received seawater, wherein the fluid conditioning system is configured to be controlled to produce a salt concentration in the byproduct fluid, the salt concentration selected so that the byproduct fluid has a fluid density sufficient for use in an energy industry operation which is a drilling, stimulation, or completion operation; and
    performing the energy industry operation, wherein performing includes injecting an injection fluid including the byproduct fluid by a pumping device through a carrier disposed in a borehole in an earth formation and into at least one of the borehole and the earth formation.

2. The method of claim 1, wherein the fluid conditioning system includes a de-sulfonating unit configured to remove sulfonates from the seawater and the byproduct fluid.

3. The method of claim 1, wherein the energy industry operation is a stimulation operation.

4. The method of claim 3, wherein the stimulation operation is a hydraulic fracturing operation, and the injection fluid is injected as a fracturing fluid.

5. The method of claim 1, wherein injecting the injection fluid includes injecting the byproduct fluid without adding any additional ingredients.

6. The method of claim 1, further comprising combining the byproduct fluid with one or more additional ingredients configured to facilitate the energy industry operation.

7. The method of claim 1, wherein the fluid is injected from an offshore platform or vessel.

8. The method of claim 1, wherein the fluid conditioning system is a reverse osmosis membrane system, the membrane system configured to remove an amount of salt from the seawater and produce the byproduct fluid having the selected salt.

9. The method of claim 1, further comprising at least partially desalinating the seawater by the fluid conditioning system, and directing the byproduct fluid via a fluid line to the pumping device.

10. A system for performing an energy industry operation, comprising:
    a fluid conditioning system configured to receive seawater, at least partially desalinate the seawater and produce desalinated seawater and a byproduct fluid, the byproduct fluid having a higher salt concentration and a higher fluid density than the received seawater, wherein the fluid conditioning system is configured to be controlled to produce a salt concentration in the byproduct fluid, the salt concentration selected so that the byproduct fluid has a fluid density sufficient for use in an energy industry operation which is a drilling, stimulation, or completion operation; and
    an injection system configured to receive the byproduct fluid, the injection system including a pumping device configured to inject an injection fluid including the byproduct fluid through a carrier disposed in a borehole in an earth formation and into at least one of the borehole and the earth formation as part of the energy industry operation.

11. The system of claim 10, wherein the fluid conditioning system includes a de-sulfonating unit configured to remove sulfonates from the seawater and the byproduct fluid.

12. The system of claim 10, wherein the energy industry operation is a stimulation operation.

13. The system of claim 12, wherein the stimulation operation is a hydraulic fracturing operation, and the injection fluid is injected as a fracturing fluid.

14. The system of claim 10, wherein injecting the injection fluid includes injecting the byproduct fluid without adding any additional ingredients.

15. The system of claim 10, further comprising a fluid treatment device configured to combine the byproduct fluid with one or more additional ingredients configured to facilitate the energy industry operation.

16. The system of claim 10, wherein the injection fluid is injected from an offshore platform or vessel.

17. The system of claim 10, wherein the fluid conditioning system is a reverse osmosis membrane system, the membrane system configured to remove an amount of salt from the seawater and produce the byproduct fluid having the selected salt concentration.

* * * * *